United States Patent
Cohen et al.

(10) Patent No.: US 7,149,686 B1
(45) Date of Patent: Dec. 12, 2006

(54) SYSTEM AND METHOD FOR ELIMINATING SYNCHRONIZATION ERRORS IN ELECTRONIC AUDIOVISUAL TRANSMISSIONS AND PRESENTATIONS

(75) Inventors: Paul S. Cohen, Yorktown Heights, NY (US); John R. Dildine, Lakeville, CT (US); Edward J. Gleason, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 09/602,262

(22) Filed: Jun. 23, 2000

(51) Int. Cl.
*G10L 15/12* (2006.01)
*G10L 21/06* (2006.01)

(52) U.S. Cl. ...................... 704/241; 704/278
(58) Field of Classification Search ............... 704/235, 704/242, 254, 260, 267, 270, 276, 241, 278; 386/95, 96
See application file for complete search history.

(56) References Cited

U.S. PATENT DOCUMENTS

| | | | | |
|---|---|---|---|---|
| 5,608,839 A * | 3/1997 | Chen | ............ | 704/235 |
| 5,835,667 A * | 11/1998 | Wactlar et al. | ............ | 386/96 |
| 5,844,600 A * | 12/1998 | Kerr | ............ | 348/14.12 |
| 6,219,640 B1 * | 4/2001 | Basu et al. | ............ | 704/246 |
| 6,317,716 B1 * | 11/2001 | Braida et al. | ............ | 704/275 |
| 6,366,885 B1 * | 4/2002 | Basu et al. | ............ | 704/270 |
| 6,505,153 B1 * | 1/2003 | Van Thong et al. | ............ | 704/211 |
| 6,510,279 B1 * | 1/2003 | Morishita | ............ | 386/96 |
| 6,697,120 B1 * | 2/2004 | Haisma et al. | ............ | 348/515 |
| 6,839,672 B1 * | 1/2005 | Beutnagel et al. | ............ | 704/260 |
| 6,862,569 B1 * | 3/2005 | Basso et al. | ............ | 704/260 |

OTHER PUBLICATIONS

G. David Forney, Jr. "The Viterbi Algorithm." Proceedings of the IEEE, Mar. 1973.
Lalit R. Bahl, Member, IEEE; Frederick Jelinek, Fellow, IEEE; and Robert L. Mercer. "A Maximum Likelihood Approach to Continuous Speech Recognition." IEEE Transactions on Pattern Analysis and Machine Intelligence. vol. PAMI-5, No. 2, Mar. 1983.
Andrew J. Viterbi. "Error Bounds for Convolutional Codes and as Asymptotically Optimum Decoding Algorithm." IEEE Transactions on Information Theory, Apr. 1967.
Ashish Verma, Tanveer Faruquie, Chalapathy Neti, Sankar Basu and Andrew Senior. "Late Integration in Audio-Visual Continuous Speech Recognition."
S. Basu, C. Neti, N. Rajput, A. Senior, L. Subramaniam, and A. Verma. "Audio-visual Large Vocabulary Continuous Speech Recognition in the Broadcast Domain." IEEE Multimedia Signal Processing, Sep. 1999.

* cited by examiner

*Primary Examiner*—Martin Lerner
(74) *Attorney, Agent, or Firm*—Thu Ann Dang; Anne Vachon Dougherty

(57) ABSTRACT

A system and method for eliminating synchronization errors using speech recognition. Using separate audio and visual speech recognition techniques, the inventive system and method identifies visemes, or visual cues which are indicative of articulatory type, in the video content, and identifies phones and their articulatory types in the audio content. Once the two recognition techniques have been applied, the outputs are compared to determine the relative alignment and, if not aligned, a synchronization algorithm is applied to time-adjust one or both of the audio and the visual streams in order to achieve synchronization.

10 Claims, 3 Drawing Sheets

SYSTEM AND METHOD FOR ELIMINATING SYNCHRONIZATION ERRORS IN ELECTRONIC AUDIOVISUAL TRANSMISSIONS AND PRESENTATIONS

FIELD OF THE INVENTION

The invention relates generally to multimedia applications and more particularly to the synchronization of audio to motion picture or video pictures.

BACKGROUND OF THE INVENTION

A challenge to the effective presentation of multimedia content is time synchronization, for example the synchronization of the visual content of a motion picture or video to the corresponding sound. Depending on the exact media involved, the lack of time synchronization can be caused by a variety of problems. For example, a film loop in a movie theater or on a television broadcast may have its sound noticeably out of synchronization with its picture because of operator difficulties in establishing the appropriate tension on the film. Another potential cause of synchronization errors is a difference in the transmission time between the video, which is often sent via satellite, and the audio, which is often sent over land lines which provide greater security and reliability; which procedure generates an undesirable time differential between picture and audio. Synchronization problems also commonly occur in live broadcasts when digital effects are inserted into video, causing a time delay in the visual stream but not in the audio stream.

Prior art synchronization techniques include the use of clapsticks in original double-system filming (i.e., the common practice of recording sound separately from the filmed image stream) to provide a visible and audible cue point to align picture and sound; continuous time code (i.e., a standardized clock reference) recorded with sound and visually recorded on film for time alignment of picture and sound; and, continuous time code integrated into video picture and sound, used to provide time references for synchronization of picture and sound when they are processed separately, as is commonly the case. Generally, however, prior art synchronization techniques rely on a human to detect a lack of synchronicity and to attempt to re-align the content.

It is therefore an objective of the present invention to provide an improved system and method for synchronizing audio to motion picture or video.

Yet another objective of the present invention is to economically utilize speech recognition techniques for synchronizing audio to visual content.

SUMMARY OF THE INVENTION

The foregoing and other objectives are realized by the present invention which comprises a system and method for eliminating synchronization errors using speech recognition. Using separate audio and visual speech recognition techniques, the inventive system and method identifies visemes, or visual cues which are indicative of articulatory type, in the video content, and identifies phones and their articulatory types in the audio content. Once the two recognition techniques have been applied, the outputs are compared to determine the relative alignment and, if not aligned, a synchronization algorithm is applied to time-adjust one or both of the audio and the visual streams in order to achieve synchronization.

BRIEF DESCRIPTION OF THE DRAWINGS

The invention will now be described in greater detail with specific reference to the appended drawings wherein.

DETAILED DESCRIPTION OF THE INVENTION

Figure 1:
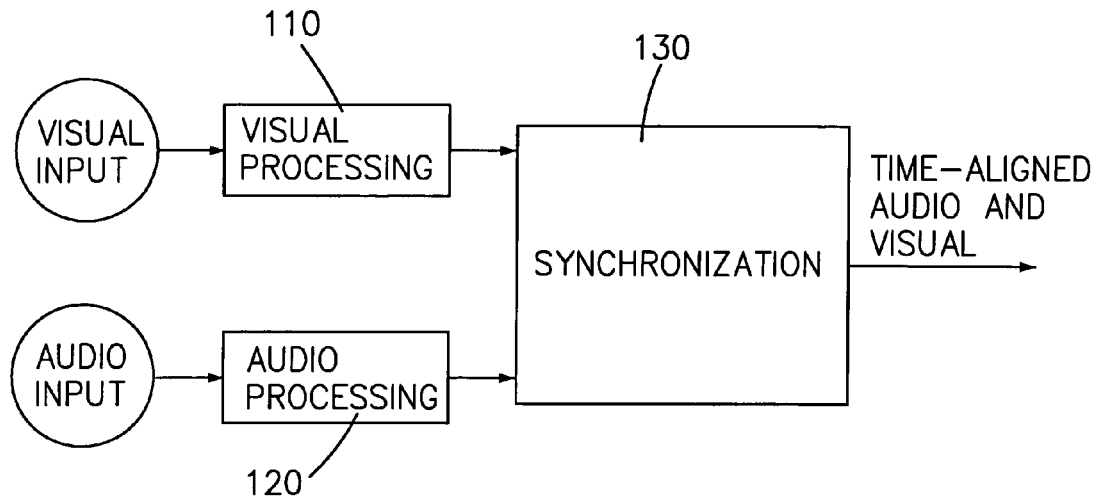
FIG. 1 provides a schematic representation of a speech recognition system is accordance with the present invention.

The present invention makes use of computer-based audio and visual speech recognition techniques to automatically adjust for synchronization errors whenever visual facial data and audio/speech data are available in a presentation. The following terms will be used throughout the detailed description.

Allophone—an instantiation of, or a "position variant" of, a phone.

Articulatory type—a speech sound type (e.g., bilabial consonant, labiodental consonant, lip-rounded vowel, open vowel, etc.) which is characterized by specific mouth movements.

Phone—an individual speech sound.

Phoneme—a component of speech comprising multiple allophones, which component functions as a minimum distinctive unit of sound in a linguistic system (e.g., the English language has ~52 phonemes). A1

Viseme—the minimum distinctive visual manifestation of an acoustic identification (e.g., of an articulatory type) representation in a video or motion picture. A2

The present invention takes advantage of the advancements achieved in the field of visual information, or visemes, in speech recognition, which are the subject of co-pending U.S. patent application Ser. No. 09/452,919 filed Dec. 2, 1999 (YO999-428) entitled "Late Integration in Audio-Visual Continuous Speech Recognition" by Verma, et al; patent application Ser. No. 09/369,707 (YO999-317) entitled "Methods and Apparatus for Audio-Visual Speech Detection and Recognition" by S. Basu, et al; and Ser. No. 09/369,706 (YO999-318) entitled "Methods and Apparatus for Audio-Visual Speaker Recognition and Utterance Verification" by S. Basu, et al now U.S. Pat. No. 6,219,640 which issued on 17 Apr. 2001. As detailed therein, visual information, such as the mouth parameters of height, width, and area, along with derivative image information are used to continuously recognize speech, particularly in a non-controlled environment which may have multiple extraneous noise sources. Further to the enhancement of speech recognition using facial analysis (see: the U.S. Pat. No. 6,219,640 patent) and the speaker recognition using audio and visual recognition techniques (the U.S. Pat. No. 6,219,640 patent), the Verma patent application focusses on the fusion (or alignment) of data output from a visual recognizer and audio recognizer to improve speech recognition accuracy and to provide automatic speech detection. More particularly, the Verma patent application processes a video signal to identify a class of the most likely visemes found in the signal. Thereafter, the most likely phones and/or phonemes associated with the identified visemes, or with the audio signal, are considered for audio recognition purposes. Therefore, the system and method of the Verma patent applications use both audio and video processing to discern phones produced by the subject, and the phones are, in turn, linked together to discern words.

Under the present invention, audio and video processing are both performed; however, the manner in which the processing proceeds to produce an output, and the use to which the output is made are significantly different from that seen in the Verma patent application. Moreover, the present invention can be implemented in a variety of situations, as will be further detailed below, and not just for continuous recognition of utterances of a live speaker.

Video recognition processing can be conducted in one of a plurality of processing sequences. As described in the aforementioned Verma patent, an image pyramid can first be used for the identification of face candidates, followed by the extraction of a mouth image using facial feature detectors. Once the locating of important facial features has been completed and the mouth image identified, the system performs analysis of the visemes, or visual image components of the mouth image, in order to recognize what speech component is being emitted from the mouth. The aforementioned patent application used probability analysis of the visual information to identify one or more phoneme candidates which are most likely to be associated with the viseme, followed by selection of one of the ~52 English language phonemes. While the Verma patent provides a high degree of speech recognition accuracy, the method is processing-intensive and is not necessarily suitable for use in all instances where time synchronization is required.

FIG. 1 provides a schematic representation of a speech recognition system in accordance with the present invention. The inventive speech recognition system comprises a visual recognition processing segment 110, an audio recognition processing segment 120, and a synchronization segment 130 wherein the outputs of components 110 and 120 are time-synchronized (or time-aligned). The visual recognition segment 110 comprises components of the type discussed in the aforementioned patent applications, which locate and analyze facial features, and specifically the mouth image, in a visual presentation, as discussed below with reference to FIG. 2, and additionally includes a processing component for identifying the articulatory type of speech which is indicated by the analysis of the mouth image and for providing a video segment output which comprises time-aligned articulatory types.

The audio recognition segment 120 comprises components of the type known in the art, as detailed in the article entitled "A Maximum Likelihood Approach to Continuous Speech Recognition" by L. Bahl, et al, IEEE Transactions on Pattern Analysis and Machine Intelligence (1983). In operation, the audio recognition segment uses a processing component to interpret either intermediate output of a phonetic recognition module or intermediate word output and to generate an audio output which also comprises time-aligned articulatory types. The video segment output and the audio segment output are then provided to the synchronization segment 130 for appropriate synchronization based on the articulatory type outputs.

Figure 2:
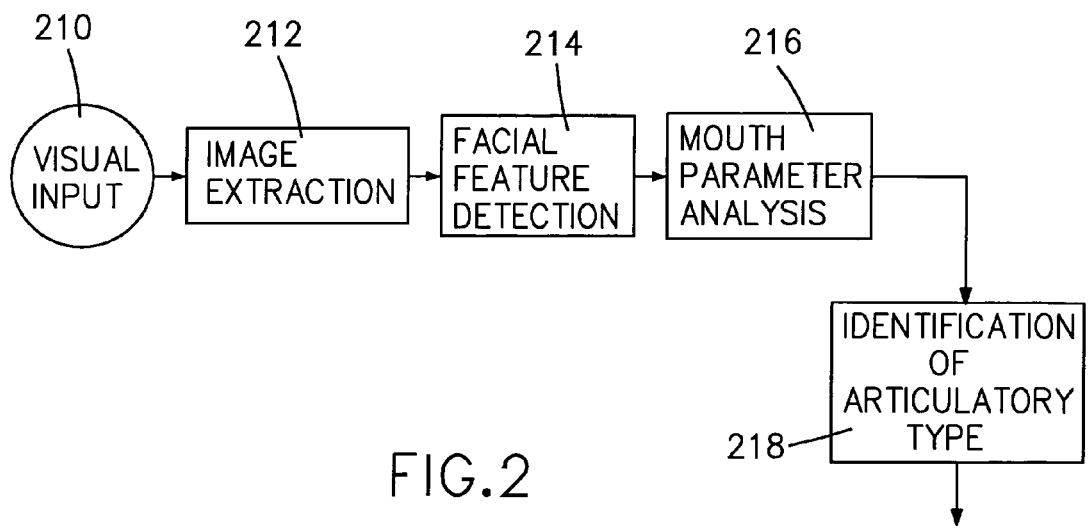
FIG. 2 illustrates a representative visual interpretation process flow for use in the present invention.

FIG. 2 illustrates a representative visual interpretation process flow for use in the present invention. The visual input is introduced at 210 and may be a video signal, a motion picture stream, or a live video stream to which audio must be synchronized. The first step for processing the visual input is the image extraction step which is conducted at 212. As detailed above, the image extraction step may be conducted by pyramid overlay or other equivalent extraction technique. Once the image of interest (i.e., the facial image) has been located at step 212, the image is analyzed to detect facial features at 214 and specifically to detect the location of the mouth. Analysis of mouth parameters is conducted at step 216, to determine such relative parameter values as mouth width in relation to height, tongue location, etc. The relative mouth parameter values are sufficient to allow the system to identify which articulatory type is being formed by the mouth at step 218. A database having mouth parameters correlated to articulatory type for the relevant language (e.g., English, French, etc.) is used in step 218 for the identification of articulatory type. The output of the visual speech recognizer is time-stamped with a time stamp so that an identified articulatory type can be readily located for synchronization.

In accordance with the present invention, it is not necessary to identify specific phones or phonemes in order to synchronize the audio to the video as long as the articulatory type of the speech utterance can be identified. To use the English language as an example, it is sufficient for the visual speech recognizer to recognize that, for example, a bilabial consonant (p or b or m), or a labiodental consonant (f or v), or a lip-rounded vowel or semi-vowel (u as in blue, o as in go, w, etc), or an open vowel (short a as in cat, broad a as in father, etc.) is being formed by the mouth. The output of the visual speech recognition component of the present invention therefore, comprises time-stamped articulatory types.

Figure 3:
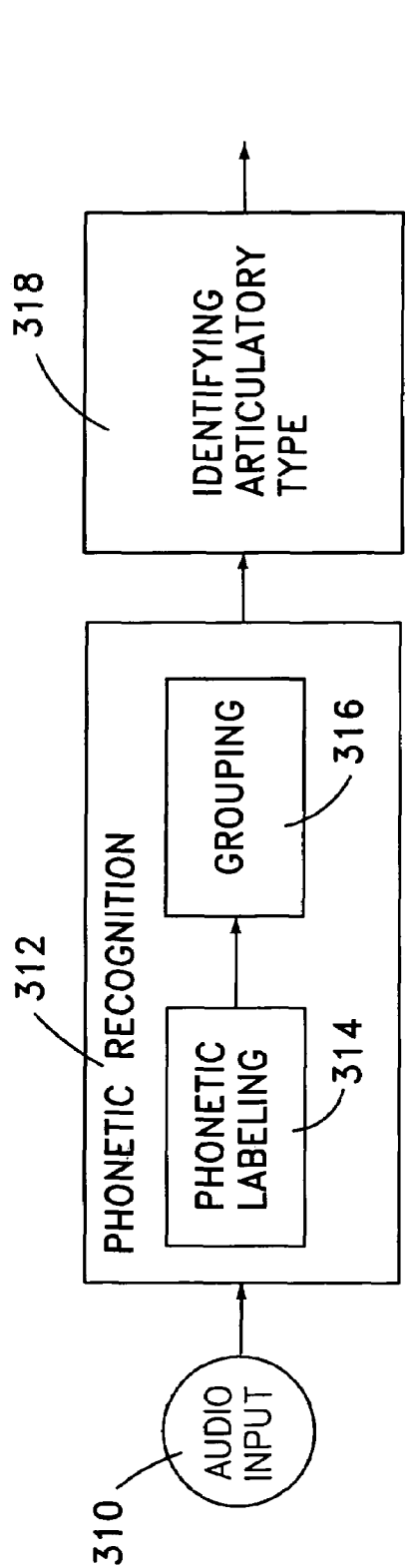
FIG. 3 illustrates a representative audio interpretation process flow for use in the present invention.

FIG. 3 illustrates one representative audio interpretation process flow for use in the present invention. Audio input is provided at 310 for phonetic recognition at step 312. Phonetic recognition comprises identification of phones, which phonetic recognition process is typically implemented by the steps of phonetic labeling at 314 followed by grouping into phones at 316. The phonetic labeling at step 314 comprises labeling each successive time sample, of length typically on the order of 10 msec., as the nearest-matching member of a predetermined set of phonetic prototypes. The grouping step at 316 comprising grouping successive time-sample labels into recognized phones. Each phone, which is time stamped as a result of the processing in 314, is then characterized at step 318 to identify its articulatory type. The output of the FIG. 3 process flow, therefore, comprises time stamped articulatory types which have been identified from the audio input.

Figure 4:
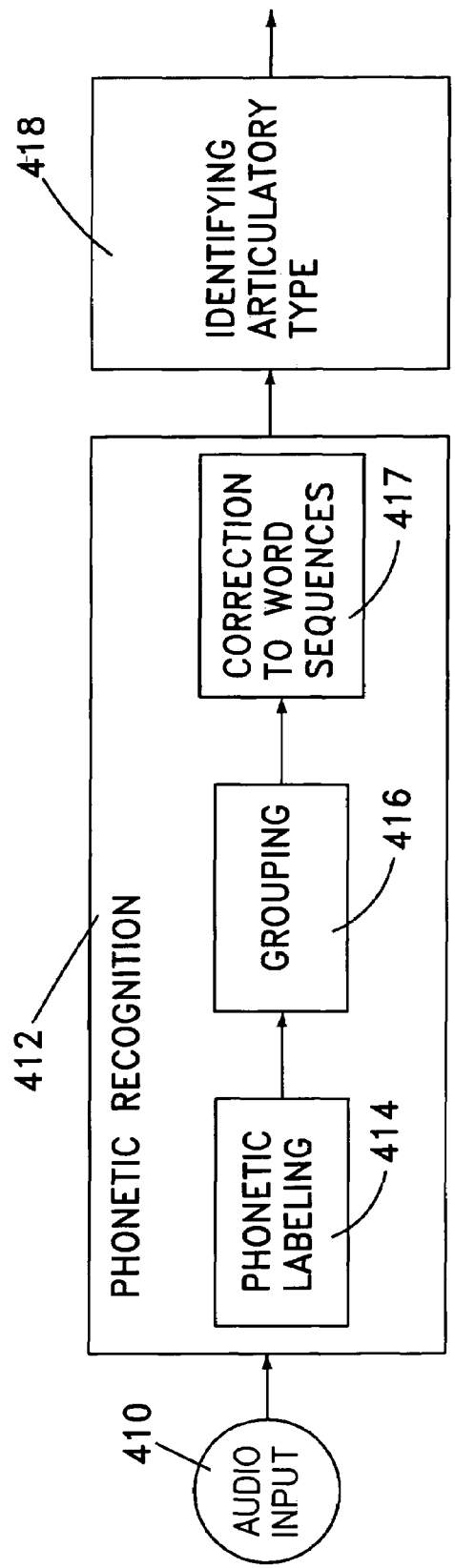
FIG. 4 illustrates an alternative representative audio interpretation process flow for use in the present invention.

FIG. 4 illustrates an alternative representative audio interpretation process flow for use in the present invention. Parallel to the process illustrated in FIG. 3, audio input is provided at 410 for phonetic recognition at 412. Phonetic labeling is accomplished at 414 and grouping into recognized phones is done at 416. These recognized phones are used in conjunction with a "language model" 417, which is comprised of a grammar or of a table of statistical likelihoods of word sequences or of a combination of these two, to estimate the sequence of words instantiated by the stream of recognized phones. This intermediate output in words (i.e., what is commonly the final output of the audio speech recognizer) is used as the audio starting point for this process. Each word is then looked up in the phonetic-dictionary module (the "baseform lexicon") of the audio processing segment in order to establish a string of time-aligned phones. Then, as in the previous option detailed in FIG. 3, each phone is characterized by a table lookup procedure as to its articulatory type. The output of the FIG. 4 process flow is, therefore, time stamped articulatory types which have been identified from the audio input.

Figure 5:
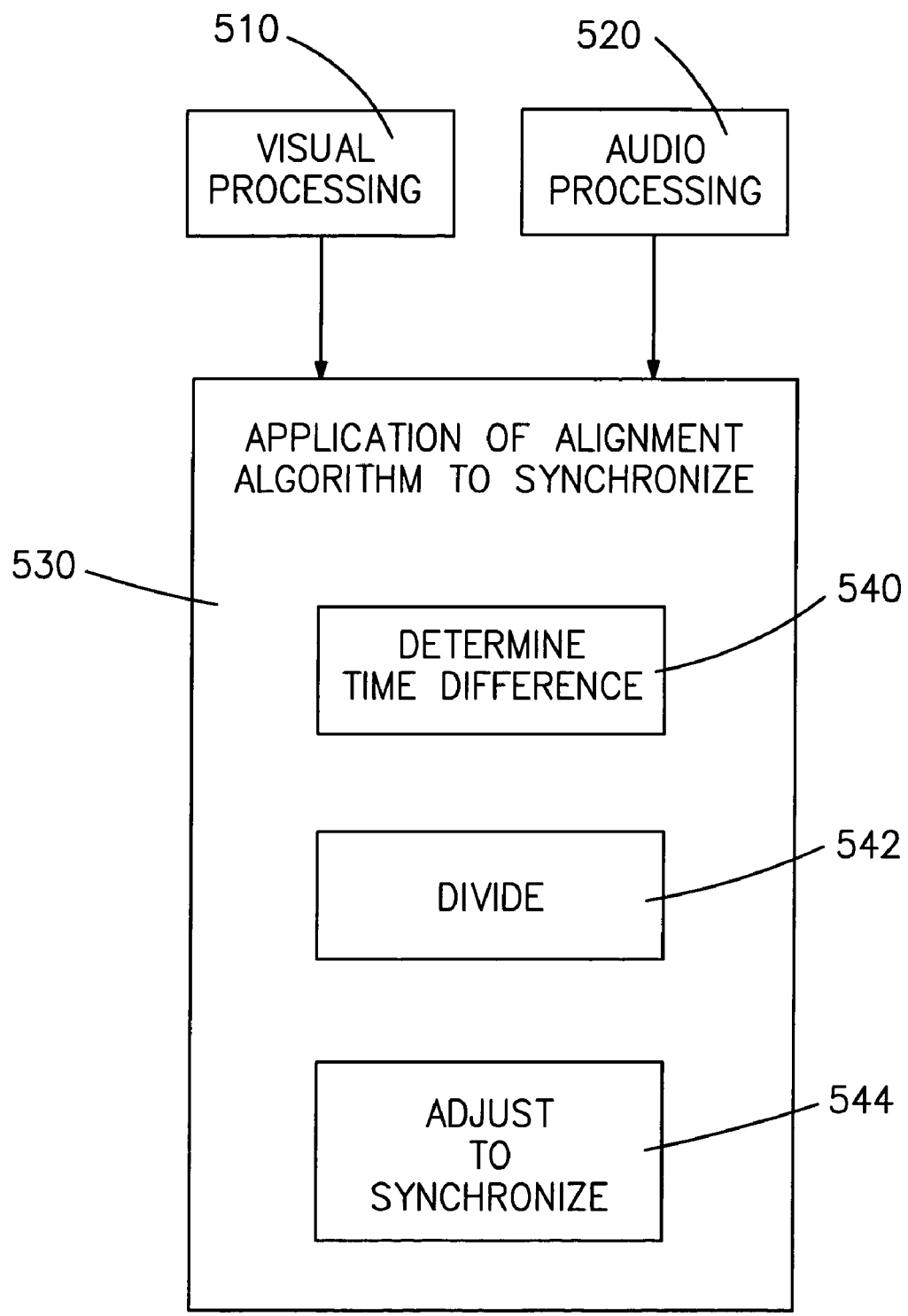
FIG. 5 provides a representative process flow for implementing the present invention.

FIG. 5 provides a representative process flow for implementing the present invention. The visual processing 510 in visual processing segment (110 of FIG. 1) is conducted on the visual input, independent of, but often simultaneously with, the processing of the audio input at 520 in the audio processing segment (120 of FIG. 1). The time-aligned output of the visual component and the time-aligned output of the audio component are provided for algorithmic alignment at 530 in the synchronization segment (130 of FIG. 1). The algorithmic alignment, which uses methods which are known in the art such as Viterbi alignment (as discussed in the aforementioned Bahl, et al article, as well as in an article entitled "The Viterbi Algorithm" by G. David Forney, Jr. from the Proceedings of the IEEE (Mar. 1973), performs synchronization of the time-stamped articulatory type output of the visual speech recognizer with the time-stamped articulatory type output of the audio speech recognizer. The synchronization can be performed over short or long stretches, as desired, e.g., from a fraction of a second to several hours.

If the audio and video time alignments are sufficiently close in time (e.g., less than or equal to 0.5 of the time taken up by one frame on the audiovisual medium making use of the present invention), the audio and visual portions of the presentation are deemed to be synchronized. If not, a synchronization algorithm, which time adjusts the two portions, is invoked. Preferably, because the change is generally less noticeable and disturbing to the audience, the audio portion is time-adjusted to the visual portion; however if deemed necessary, the visual portion can be time-adjusted to the audio portion; or, each can be time-adjusted at a different rate to achieve alignment. One advantageous version of the synchronization algorithm, which adjusts the audio and visual portions gradually so as not to be noticeable to the audience operates as follows a) at step 540, determine the difference in time between the leftmost matching articulatory types of the visual and audio speech recognizer output;

(b) at step 542, divide the difference into segments of length equal to 0.5 of the frame length of the relevant audiovisual medium (plus any remainder). (note: the frame length will vary according to the medium. For example, for movies in the U.S., it is ¼₂₄sec; for video in the U.S., it is approximately ⅟₃₀sec; and for movies and video in Europe, it is ⅟₂₅sec.); and (C) at step 544, adjust the audio to the visual representation by moving the audio forward or backward (as appropriate) by one segment per frame until all segments (and any segments that are moved should be adjusted back to their original frequencies, by means familiar to those skilled in the art, so as to appear natural to the audience.

The present invention has many applications including, but not limited to, the following:

(1) synchronization of sound and picture on a film loop in movie theaters, on television, etc.;

(2) synchronization of sound and picture for movies, television, etc. delivered via satellite;

(3) synchronization of audio to video being transmitted separately from a remote television feed, wherein each station that picks up the feed would have need of the invention as preferably implemented at the individual cable network boxes);

(4) synchronization of sound and picture for presentations over the internet;

(5) synchronization of sound and picture for representations in animated productions, such as characters in traditional cartoons and computer-generated characters;

(6) selection among possible synonyms for dubbing of foreign language movies, videotapes, etc. (The synonyms would be coded according to articulatory types in a lexicon. The appropriate word or words would be chosen on the basis of best phonetic match, and then time-aligned according to the methods described hereinabove);

(7) automation of the laying in of separately recorded sound effects, using nearby speech for time alignment; and (8) reconstitution of full audio from multiple sound tracks (e.g., removal of undesired timing effects based on distant microphone reception of a performance or news event).

It is noteworthy that the synchronization algorithm can be applied, as desired, to prerecorded audiovisual materials; or it can be applied on-the-fly and continuously to, for example, "live" audiovisual materials. Also, although this invention has been described using English-language examples, there is nothing that restricts it to English and it can be implemented for any language. Finally, it should be understood that, while the highest visual recognition accuracy has been realized using facial features linked to speech, it is possible to recognize non-speech acoustic signatures, to link those non-speech acoustic signatures to non-speech visual "cues" (for example, hand-clapping), to time-stamp the audio and visual output streams, and to synchronize the audio and video based on the identified cues in the time stamped output streams. Under such a visual recognition scenario, the process flow of FIG. 2 would be generalized to the steps of image extraction, feature detection, feature parameter analysis, and correlation of acoustic signatures stored in a database to the feature parameters. For a detailed discussion of the training and use of speech recognition means for identifying audio sources by acoustic signatures, please see co-pending patent application Ser. No. 09/602, 452, (YOR9-2000-0130) entitled "System and Method for Control of Lights, Signals, Alarms Using Sound Detection" by W. Ablondi, et al, the teachings of which are herein incorporated by reference.

The invention has been described with reference to a preferred implementation. It should be understood that one having skill in the relevant art will recognize areas for modification of the described implementation which would not depart from the spirit and scope of the invention as set forth in the appended claims.

The invention claimed is:

1. A method for providing synchronization of audio to video content comprising the steps of:
processing a video signal to generate a video output comprising at least one time stamped acoustic identification of the content of the audio associated with the video signal along with the video content;
processing an audio signal to generate an audio output comprising at least one time stamped acoustic identification of the content of said audio signal; and
synchronizing the video signal to the audio signal by adjusting at least one of the signals to align at least one acoustic identification from the video signal with a corresponding acoustic identification from the audio signal.

2. The method of claim 1 wherein said synchronizing comprises applying a Viterbi algorithm to the signals.

3. The method of claim 2 wherein each acoustic identification comprises an articulatory type.

4. The method of claim 1 wherein said synchronizing comprising adjusting the audio signal to cause the acoustic identification from the audio signal to be aligned with the acoustic identification of the video signal.

5. The method of claim 4 wherein each acoustic identification comprises an articulatory type.

6. The method of claim 1 wherein said processing a video signal comprises the steps of;
    extracting at least one image from the video signal;
    detecting at least one feature in said at least one image;
    analyzing the parameters of said feature; and
    correlating at least one acoustic identification to the parameters of said feature.

7. The method of claim 6 wherein each acoustic identification comprises an articulatory type and wherein said at least one feature comprises a facial feature.

8. The method of claim 1 wherein each acoustic identification comprises an articulatory type.

9. A system for providing synchronization of audio to video content comprising:
    a video processing component for processing a video signal to generate a video output comprising at least one time stamped acoustic identification of the content of the audio associated with the video signal along with the video content;
    an audio processing component for processing an audio signal to generate an audio output comprising at least one time stamped acoustic identification of the content of said audio signal; and
    a synchronization component comprising the video signal to the audio signal by adjusting at least one the signals to align at least one acoustic identification from the video signal with a corresponding acoustic identification from the audio signal.

10. The system of claim 9 wherein said video processing component comprises:
    an extraction component for extracting at least one image from the video signal;
    a detection component for detecting at least one feature in said at least one image; and
    a processing component for analyzing the parameters of said feature and for correlating at least one acoustic identification to the parameters of said feature.

* * * * *